United States Patent
Conlon et al.

(10) Patent No.: US 10,160,306 B2
(45) Date of Patent: Dec. 25, 2018

(54) WIDE RANGE COMPOUND SPLIT TRANSMISSION WITH A FIXED INPUT GEAR REDUCTION RATIO

(71) Applicant: GM GLOBAL TECHNOLOGY OPERATIONS LLC, Detroit, MI (US)

(72) Inventors: Brendan M. Conlon, Rochester Hills, MI (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 15/224,963

(22) Filed: Aug. 1, 2016

(65) Prior Publication Data

US 2018/0029460 A1    Feb. 1, 2018

(51) Int. Cl.
| | |
|---|---|
| *B60K 6/365* | (2007.10) |
| *B60K 6/54* | (2007.10) |
| *F16H 3/66* | (2006.01) |
| *F16H 3/72* | (2006.01) |
| *B60K 6/445* | (2007.10) |
| *B60K 6/547* | (2007.10) |
| *F16H 37/04* | (2006.01) |
| *B60K 6/38* | (2007.10) |
| *F16H 3/44* | (2006.01) |

(52) U.S. Cl.
CPC ............... *B60K 6/54* (2013.01); *B60K 6/365* (2013.01); *B60K 6/445* (2013.01); *B60K 6/547* (2013.01); *F16H 3/66* (2013.01); *F16H 3/666* (2013.01); *F16H 3/728* (2013.01); *B60K 2006/381* (2013.01); *B60Y 2200/92* (2013.01); *B60Y 2400/73* (2013.01); *F16H 2003/442* (2013.01); *F16H 2037/047* (2013.01); *F16H 2037/048* (2013.01); *F16H 2200/201* (2013.01); *F16H 2200/2007* (2013.01); *F16H 2200/2033* (2013.01); *F16H 2200/2035* (2013.01); *F16H 2200/2097* (2013.01); *Y10S 903/911* (2013.01); *Y10S 903/917* (2013.01)

(58) Field of Classification Search
CPC ............... F16H 3/66; F16H 2200/2033; F16H 2200/2007; F16H 2200/2035; F16H 2200/201; F16H 2037/047; F16H 2037/048; B60K 6/365; B60Y 2400/73; B60Y 2200/92; Y10S 903/911
USPC ............ 475/5, 207, 218, 219, 302, 343, 903
See application file for complete search history.

(56) References Cited

U.S. PATENT DOCUMENTS

| | | | | |
|---|---|---|---|---|
| 6,558,283 B1 * | 5/2003 | Schnelle | ................. | B60K 6/36 180/65.235 |
| 7,037,230 B2 * | 5/2006 | Dupriez | ................... | F16H 3/72 180/65.235 |

(Continued)

*Primary Examiner* — Roger L Pang
(74) *Attorney, Agent, or Firm* — Quinn IP Law

(57) ABSTRACT

A transmission includes an input member, an output member, a first electric device, and a second electric device. A first planetary gear set is coupled to the first electric device. A second planetary gear set is coupled to the second electric device. The output is coupled to both the first planetary gear set and the second planetary gear set. The input is connected to the first planetary gear set. A fixed ratio gear reduction system couples the input and the second planetary gear set. The fixed ratio gear reduction system is operable to transmit rotation from the input to the second planetary gear set at a reduced rotational speed and at an increased torque.

13 Claims, 3 Drawing Sheets

(56) References Cited

U.S. PATENT DOCUMENTS

| | | | | |
|---|---|---|---|---|
| 7,128,037 | B2 * | 10/2006 | Tumback | B60K 1/02 |
| | | | | 123/179.3 |
| 7,395,889 | B2 * | 7/2008 | Sugiyama | B60K 6/365 |
| | | | | 180/243 |
| 7,491,144 | B2 | 2/2009 | Conlon | |
| 8,337,352 | B2 * | 12/2012 | Morrow | B60K 6/365 |
| | | | | 475/302 |
| 8,840,500 | B2 | 9/2014 | Tamai et al. | |
| 2017/0108085 | A1 * | 4/2017 | Morrow | B60K 6/365 |
| 2017/0363180 | A1 * | 12/2017 | Steinberger | B60K 6/365 |

* cited by examiner

WIDE RANGE COMPOUND SPLIT TRANSMISSION WITH A FIXED INPUT GEAR REDUCTION RATIO

TECHNICAL FIELD

The disclosure generally relates to an electro-mechanical transmission for a vehicle, and more specifically to a compound split transmission.

BACKGROUND

An electro-mechanical transmission includes a gear set that interconnects one or more electric devices and a final drive of the vehicle, e.g., an axle, wheels, etc. The gear set changes rotational speed and torque that is output from the electric devices, and delivers it to the final drive. The transmission may further be configured to receive torque from another power source, such as but not limited to an internal combustion engine. The transmission must also change the rotational speed and torque that is received from the engine, and provide it to the final vehicle drive system. One or more of the electric devices may be operated simultaneously with the engine, or may operate with the engine turned off and disconnected from the system, in order to provide a tractive power for the vehicle.

SUMMARY

A transmission is provided. The transmission includes an input member, an output member, a first electric device, and a second electric device. A first planetary gear set is coupled to the first electric device. The first planetary gear set includes a first sun gear, a first ring gear, and a plurality of first planet gears attached to a first planet carrier. A second planetary gear set is coupled to the second electric device. The second planetary gear set includes a second sun gear, a second ring gear, and a plurality of second planet gears attached to a second planet carrier. The output is coupled to both the first planetary gear set and the second planetary gear set. The input is connected to the first planetary gear set. A fixed ratio gear reduction system interconnects the input and the second planetary gear set. The fixed ratio gear reduction system is operable to transmit rotation from the input to the second planetary gear set at a reduced rotational speed and at an increased torque.

Accordingly, the transmission provides a compound split that directs torque between the first electric device and the second electric device, and is capable of providing a wide range of output gear ratios using planetary gear sets of reasonable gear sizes suitable for use in a vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a transmission is generally shown at 20. The transmission 20 is for a vehicle. The vehicle may include, but is not limited to, a car, a truck, a tractor, or some other form of vehicle. The transmission 20 is part of or a powertrain. The powertrain may include a hybrid powertrain, which includes an engine 22 (e.g. an internal combustion engine 22) and a pair of electric devices.

Figure 1:
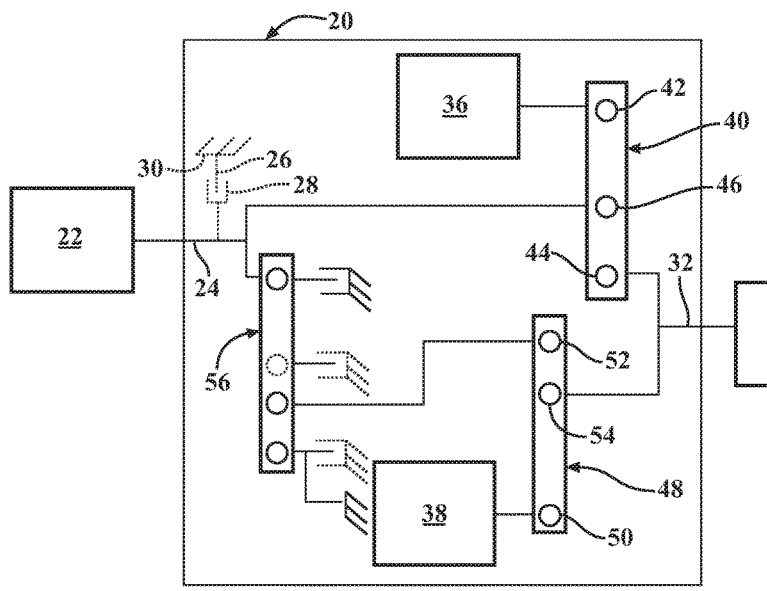
FIG. 1 is a lever diagram of a transmission of a vehicle.

Referring to FIG. 1, the transmission 20 is generally represented as a lever diagram. The description of the transmission 20 below, with reference to FIG. 1, is applicable to the different embodiments of the transmission 20 shown in FIGS. 2 through 6. FIGS. 2 through 6 show stick diagrams of different embodiments, and specific applications of each embodiment of the transmission 20 generally represented by the lever diagram of FIG. 1.

Referring to FIG. 1, the transmission 20 includes an input member 24. The input member 24 may be coupled to the engine 22 if the powertrain is equipped with an engine 22. As noted above, the engine 22 may include, but is not limited to, an internal combustion engine 22, such as a gasoline or a diesel engine 22. The engine 22 is selectively operable to generate a torque, which is applied to the input member 24. Accordingly, the input member 24 receives torque from the engine 22. The specific type and configuration of the engine 22, and the operation of the engine 22, are not pertinent to the teachings of this disclosure, and are therefore not described in detail herein.

The transmission 20 may be equipped with an input brake 26. The input brake 26 is selectively operable to ground the input member 24. The input brake 26 may include, for example, an input clutch 28 that is selectively operable to engage the input member 24 with a stationary member 30 to prevent or resist rotation of the input member 24. The stationary member 30 may include, for example, a housing of the transmission 20, or some other fixed structure of the transmission 20. As such, when the input clutch 28 is engaged, the input brake 26 prevents or limits rotation of the input member 24 relative to the stationary member 30, and when the input clutch 28 is disengaged, the input brake 26 allows rotation of the input member 24 relative to the stationary member 30. The input brake 26 may be engaged and/or disengaged to switch between hybrid operation, in which the engine 22 and one or more of the electric devices are used to power the vehicle, and a fully electric mode when only the electric devices are used to power the vehicle.

The transmission 20 further includes an output member 32. The output member 32 is coupled to a final drive system 34 of the powertrain. The final drive system 34 may include, but is not limited to, a driveshaft, a differential, a gear reduction system, an axle, one or more wheels, etc. The output member 32 transmits or outputs torque from the transmission 20 to the final drive system 34. The specific type and configuration of the final drive system 34, and the operation of the final drive system 34, are not pertinent to the teachings of this disclosure, and are therefore not described in detail herein.

The transmission 20 further includes a first electric device 36, and a second electric device 38. Each of the first electric device 36 and the second electric device 38 may include, but are not limited to, and electric motor or an electric motor/generator. It should be appreciated that the first electric device 36 and the second electric device 38 may include a device other than the exemplary electric motor or electric motor/generator described herein. Furthermore, it should be appreciated that both the first electric device 36 and the second electric device 38 may include an electric motor, or may both include an electric motor/generator. Alternatively, it should be appreciated that one of the first electric device 36 and the second electric device 38 may include an electric motor or some other device, and the other of the first electric device 36 and the second electric device 38 may include an electric motor/generator or some other device.

The transmission 20 includes a first planetary gear set 40, which is coupled to the first electric device 36. The first planetary gear set 40 includes a first sun gear 42, a first ring gear 44, and a plurality of first planet gears attached to a first planet carrier 46. As is known in the art, the first sun gear 42 is concentric with a central axis. The first planet gears are disposed in meshing engagement with the first sun gear 42, and are each supported or carried by the first planet carrier 46. The first ring gear 44 surrounds and is disposed in meshing engagement with the first planet gears.

The first electric device 36 is connected to one of the first sun gear 42, the first ring gear 44, and the first planet carrier 46. As used throughout this detailed description, the term "connected" is defined as being coupled in a manner that provides a direct, one to one rotational connection, without any increase or decrease in rotational speed and/or torque therebetween. As used herein, the term "connected" includes a first device being directly connected to a second device, with no intermediate components therebetween, and also includes a first device being indirectly connected to a second device, with one or more components disposed between the first device and the second device. However, the first device is connected to the second device so long as a rotational speed and torque are not altered between the first device and the second device. As shown in the Figures, and as described herein, the first electric device 36 is connected to the first sun gear 42. However, it should be appreciated that the first electric device 36 may alternatively be connected to either the first ring gear 44 or the first planet carrier 46.

The transmission 20 includes a second planetary gear set 48, which is coupled to the second electric device 38. The second planetary gear set 48 includes a second sun gear 50, a second ring gear 52, and a plurality of second planet gears attached to a second planet carrier 54. As is known in the art, the second sun gear 50 is concentric with a central axis. The second planet gears are disposed in meshing engagement with the second sun gear 50, and are each supported or carried by the second planet carrier 54. The second ring gear 52 surrounds and is disposed in meshing engagement with the second planet gears.

The second electric device 38 is connected to one of the second sun gear 50, the second ring gear 52, and the second planet carrier 54. As shown in the Figures, and as described herein, the second electric device 38 is connected to the second sun gear 50. However, it should be appreciated that the second electric device 38 may alternatively be connected to either the second ring gear 52 or the second planet carrier 54.

The output is coupled to both the first planetary gear set 40 and the second planetary gear set 48. The output is connected to one of the first sun gear 42, the first ring gear 44, and the first planet carrier 46. As shown in the Figures, and as described herein, the output is connected to the first ring gear 44. However, it should be appreciated that the output may alternatively be connected to either the first sun gear 42 or the first planet carrier 46. The output is also connected to one of the second sun gear 50, the second ring gear 52, and the second planet carrier 54. As shown in the Figures, and as described herein, the output is connected to the second planet carrier 54. However, it should be appreciated that the output may alternatively be connected to either the second sun gear 50 or the second ring gear 52.

The input is connected to the first planetary gear set 40. As shown in the Figures, and as described herein, the input is connected to one of the first sun gear 42, the first ring gear 44, and the first planet carrier 46. More specifically, the input is connected to the first planet carrier 46. However, it should be appreciated that the input may alternatively be connected to the first sun gear 42 or the first ring gear 44.

Accordingly, regarding the first planetary gear set 40, the input is connected to one of the first sun gear 42, the first ring gear 44, and the first planet carrier 46. The output is connected to another one of the first sun gear 42, the first ring gear 44, and the first planet carrier 46, and the first electric device 36 is connected to yet another one of the first sun gear 42, the first ring gear 44, and the first planet carrier 46. It should be appreciated that the first sun gear 42, the first planet carrier 46 and the first ring gear 44 each define a respective node of the first planetary gear set 40, and that the input, the output, and the first electric device 36 are each connected to a respective node of the first planetary gear set 40. Accordingly, only one of the input, the output, and the first electric device 36 may be connected to any single node of the first planetary gear set 40. As such, if the first electric device 36 is connected to the first sun gear 42, then the input and the output may not also be connected to the first sun gear 42. Similarly, if the input is connected to the first planet carrier 46, then the output and the first electric device 36 may not also be connected to the first planet carrier 46. Furthermore, if the output is connected to the first ring gear 44, then the first electric device 36 and the input may not also be connected to the first ring gear 44. As shown in the Figures and described herein, the first electric device 36 is connected to the first sun gear 42, the input is connected to the first planet carrier 46, and the output is connected to the first ring gear 44.

A fixed ratio gear reduction system 56 couples the input and the second planetary gear set 48. The fixed ratio gear reduction system 56 is operable to transmit rotation from the input to the second planetary gear set 48 at a reduced rotational speed and at an increased torque. Preferably, the fixed ratio gear reduction system 56 provides a gear reduction ratio of between 3:1 and 6:1. More preferably, the gear reduction ratio of the fixed ratio gear reduction system 56 is between 4:1 and 5:1. As shown in the Figures, and as described herein, the fixed ratio gear reduction system 56 is connected to the second ring gear 52.

Regarding the second planetary gear set 48, the fixed ratio gear reduction system 56 is connected to one of the second sun gear 50, the second ring gear 52, and the second planet carrier 54. The output is connected to another one of the second sun gear 50, the second ring gear 52, and the second planet carrier 54, and the second electric device 38 is connected to yet another one of the second sun gear 50, the second ring gear 52, and the second planet carrier 54. It should be appreciated that the second sun gear 50, the second planet carrier 54 and the second ring gear 52 each define a respective node of the second planetary gear set 48, and that the fixed ratio gear reduction system 56, the output, and the second electric device 38 are each connected to a respective node of the second planetary gear set 48. Accordingly, only one of the fixed ratio gear reduction system 56, the output, and the second electric device 38 may be connected to any single node of the second planetary gear set 48. As such, if the second electric device 38 is connected to the second sun gear 50, then the fixed ratio gear reduction system 56 and the output may not also be connected to the second sun gear 50. Similarly, if the fixed ratio gear reduction system 56 is connected to the second ring gear 52, then the output and the second electric device 38 may not also be connected to the second ring gear 52. Furthermore, if the output is connected to the second planet carrier 54, then the second electric device 38 and the fixed ratio gear reduction system 56 may not also be connected to the second planet carrier 54. As shown in the Figures and as described herein, the second electric device 38 is connected to the second sun gear 50. The fixed ratio gear reduction system 56 may be connected to the second ring gear 52, or may alternatively be connected to the second planet carrier 54. The output may be connected to the second planet carrier 54, or may alternatively be connected to the second ring gear 52.

Figure 2:
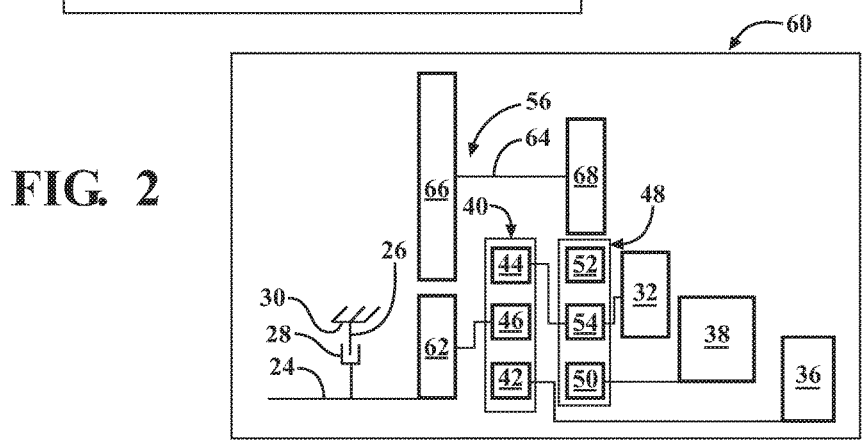
FIG. 2 is a stick diagram of a first embodiment of the transmission configured for use in a front wheel drive vehicle.
Figure 3:
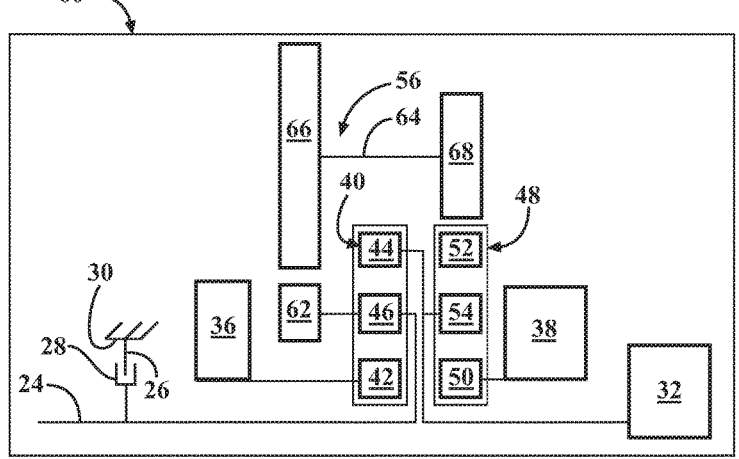
FIG. 3 is a stick diagram of the first embodiment of the transmission configured for use in a rear wheel drive vehicle.

Referring to FIGS. 2 and 3, a first embodiment of the transmission 60 is generally shown at 60. The first embodiment of the transmission 60 includes the fixed ratio gear reduction system 56 embodied as an offset countershaft 64 with fixed gears. FIG. 2 shows the first embodiment of the transmission 60 configured for use in a front wheel drive application, whereas FIG. 3 shows the first embodiment of the transmission 60 configured for use in a rear wheel drive application. Throughout the description of the first embodiment of the transmission 60, the reference numerals of the various components described above with reference to FIG. 1, are also used to identify the corresponding components in the first embodiment of the transmission 60 shown in FIGS. 2 and 3. Unless otherwise noted, the description of the transmission 20 above with reference to FIG. 1, including the description of the connections between the various components, is applicable to the first embodiment of the transmission 60 shown in FIGS. 2 and 3.

Referring to FIGS. 2 and 3, the fixed ratio gear reduction system 56 includes an idler gear 62 that is connected to the input. FIG. 2 shows the idler gear 62 directly connected to the input, whereas FIG. 3 shows idler gear 62 indirectly connected to the input via the first planet carrier 46. The fixed ratio gear reduction system 56 further includes a countershaft 64 having a first fixed gear 66 and a second fixed gear 68. The first fixed gear 66 is disposed in meshing engagement with the idler gear 62. The second fixed gear 68 is coupled to the second planetary gear set 48. More specifically, the second fixed gear 68 is disposed in meshing engagement with the second ring gear 52. The first fixed gear 66 and the second fixed gear 68 are both fixed to the countershaft 64 and rotatable with the countershaft 64. Referring to FIG. 2, the first ring gear 44 is connected to the second planet carrier 54, which is in turn connected to the output. Referring to FIG. 3, the first ring gear 44 and the second planet carrier 54 are both connected to each other, and to the output.

Figure 4:
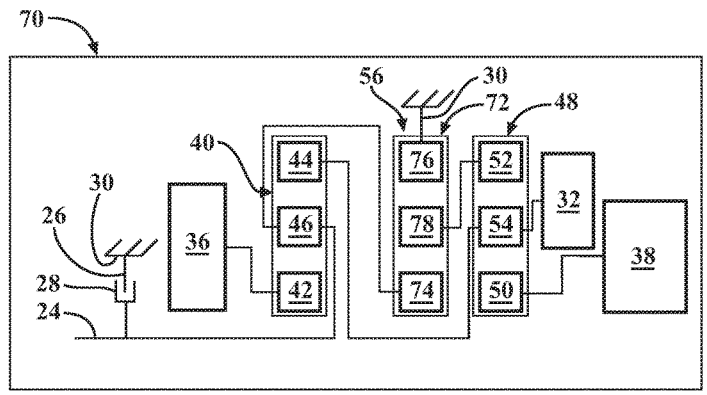
FIG. 4 is a stick diagram of a second embodiment of the transmission configured for use in a front wheel drive vehicle.
Figure 5:
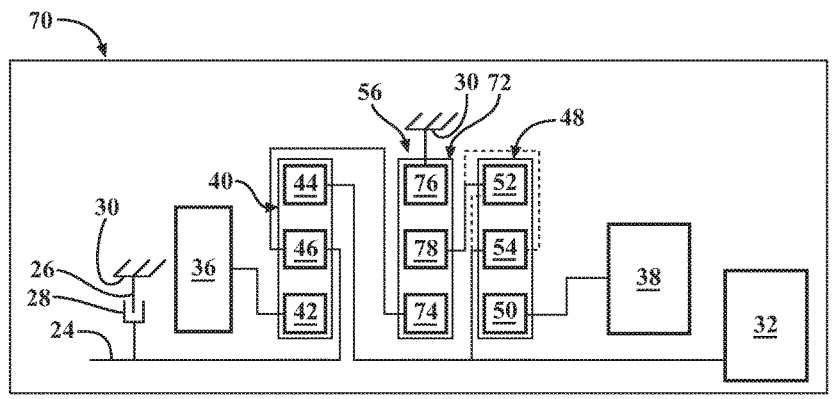
FIG. 5 is a stick diagram of the second embodiment of the transmission configured for sue in a rear wheel drive vehicle.
Figure 6:
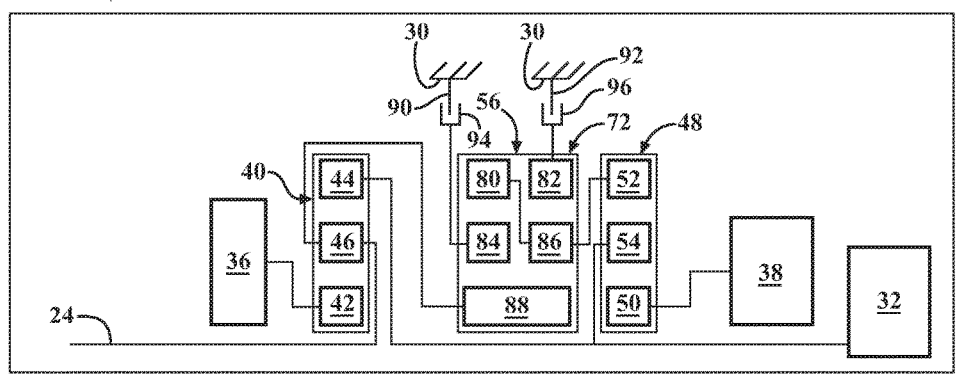
FIG. 6 is a stick diagram of the second embodiment of the transmission configured for use in a heavy duty, rear wheel drive vehicle, and operable to provide a reverse mode.

Referring to FIGS. 4 through 6, a second embodiment of the transmission 70 is generally shown at 70. The second embodiment of the transmission 70 includes the fixed ratio gear reduction system 56 embodied as a third planetary gear set 72. FIG. 4 shows the second embodiment of the transmission 70 configured for use in a front wheel drive application, FIG. 5 shows the second embodiment of the transmission 70 configured for use in a rear wheel drive application, and FIG. 6 shows the second embodiment of the transmission 70 configured for use in a heavy duty, rear wheel drive application. Throughout the description of the second embodiment of the transmission 70, the reference numerals of the various components described above with reference to FIG. 1, are also used to identify the corresponding components in the second embodiment of the transmission 70 shown in FIGS. 4 through 6. Unless otherwise noted, the description of the transmission 20 above with reference to FIG. 1, including the description of the connections between the various components, is applicable to the second embodiment of the transmission 70 shown in FIGS. 4 through 6.

Referring to FIGS. 4 and 5, the fixed ratio gear reduction system 56 includes the third planetary gear set 72. The third planetary gear set 72 includes a third sun gear 74, a third ring gear 76, and a plurality of third planet gears attached to a third planet carrier 78. As is known in the art, the third sun gear 74 is concentric with a central axis. The third planet gears are disposed in meshing engagement with the third sun gear 74, and are each supported or carried by the third planet carrier 78. The third ring gear 76 surrounds and is disposed in meshing engagement with the third planet gears.

The third ring gear 76 is grounded to a stationary member 30. The stationary member 30 may include, but is not limited to, a housing of the transmission 20, or some other feature that prevents relative rotation of the third ring gear 76. The input is connected to the third sun gear 74. The third planet carrier 78 is coupled to the second planetary gear set 48. Referring to FIG. 4, the third planet carrier 78 is connected to the second ring gear 52, and the second planet carrier 54 is connected to the output. Referring to FIG. 5, the third planet carrier 78 is shown preferably connected to the second ring gear 52 with a solid line, and the second planet carrier 54 connected to the output with a solid line. As shown in FIG. 5, an alternative arrangement shows the third planet carrier 78 connected to the second planet carrier 54 with a dashed line, and the second ring gear 52 connected to the output with a dashed line.

Referring to FIG. 6, a specialized application of the second embodiment of the transmission 70 is generally shown. As with the applications shown in FIGS. 4 and 5, the application of the second embodiment of the transmission 70 shown in FIG. 6 includes the fixed ratio gear reduction system 56 embodied as the third planetary gear set 72. However, the application shown in FIG. 6 includes a compound planetary gear set. The compound planetary gear set provides a fourth node that enables a reverse gearing for the transmission 70. The compound planetary gear set shown in FIG. 6 includes two ring gears, i.e., a fourth ring gear 80 and a fifth ring gear 82 respectively, two planet carriers, i.e., a fourth planet carrier 84 supporting a plurality of fourth planet gears and a fifth planet carrier 86 supporting a plurality of fifth planet gears respectively, and a fourth sun gear 88. The fourth planet gears and the fifth planet gears are both disposed in meshing engagement with the fourth sun gear 88. The fourth ring gear 80 is disposed in meshing engagement with the fourth planet gears. The fifth ring gear 82 is disposed in meshing engagement with the fifth planet gears.

A first gear reduction brake 90 selectively couples the fourth planet carrier 84 to a stationary member 30, such as but not limited to the housing of the transmission 70. The first gear reduction brake 90 may be selectively engaged and disengaged with a first gear reduction clutch 94 to prevent or allow rotation of the fourth planet carrier 84 relative to the stationary member 30 respectively. Accordingly, when the first gear reduction clutch 94 is engaged, the first gear reduction brake 90 prevents or limits rotation of the fourth planet carrier 84 relative to the stationary member 30, and when the first reduction clutch 94 is disengaged, the first gear reduction brake 90 allows rotation of the fourth planet carrier 84 relative to the stationary member 30.

A second gear reduction brake 92 couples the fifth ring gear 82 to a stationary member 30, such as but not limited to the housing of the transmission 70. The second gear reduction brake 92 may be selectively engaged and disengaged with a second gear reduction clutch 96 to prevent or allow rotation of the fifth ring gear 82 relative to the stationary member 30 respectively. Accordingly, when the second gear reduction clutch 96 is engaged, the second gear reduction brake 92 prevents or limits rotation of the fifth ring gear 82 relative to the stationary member 30, and when the second reduction clutch 96 is disengaged, the second gear reduction brake 92 allows rotation of the fifth ring gear 82 relative to the stationary member 30.

The fourth ring gear 80 is connected to the fifth planet carrier 86. The fifth planet carrier 86 is connected to the second ring gear 52. The first gear reduction brake 90 and the second gear reduction brake 92 may each be independently engaged and/or disengaged to provide the reverse gearing for the transmission 70. For example, the transmission 70 may be operated in a forward gearing when the first gear reduction brake 90 is disengaged to allow rotation of the fourth planet carrier 84 relative to the stationary member 30 and the second gear reduction brake 92 is engaged to prevent rotation of the fifth ring gear 82 relative to the stationary member 30. Alternatively, the transmission 70 may be operated in a reverse gearing when the first gear reduction brake 90 is engaged to prevent rotation of the fourth planet carrier 84 relative to the stationary member 30 and the second gear reduction brake 92 is disengaged to allow rotation of the fifth ring gear 82 relative to the stationary member 30.

The first gear reduction brake 90 and the second gear reduction brake 92 may each be simultaneously engaged to ground the input member 24, to prevent or resist rotation of the input member 24. As such, the first gear reduction brake 90 and the second gear reduction brake 92 may be simultaneously engaged to switch between hybrid operation, in which the engine 22 and one or more of the electric devices are used to power the vehicle, into a fully electric mode when only the electric devices are used to power the vehicle.

Figure 7:
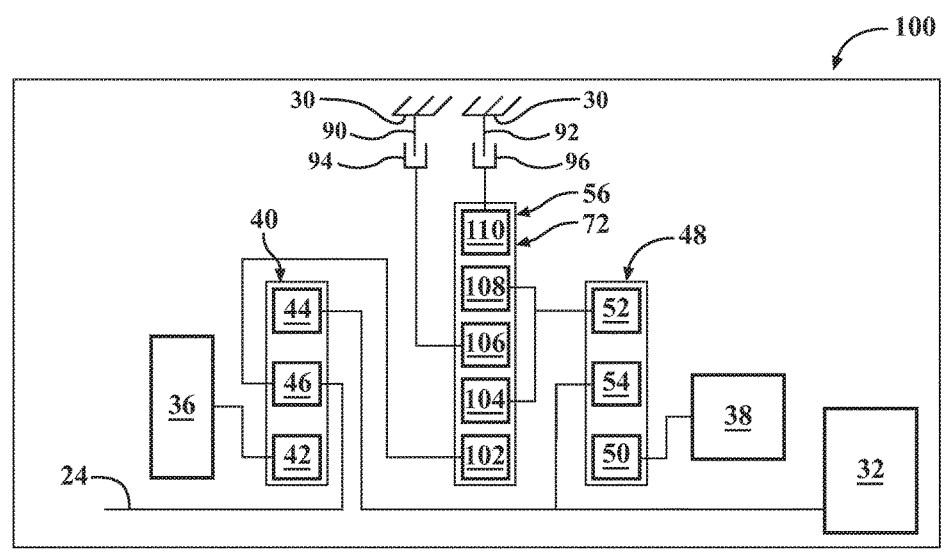
FIG. 7 is a stick diagram of a third embodiment of the transmission configured for use in a heavy duty, rear wheel drive vehicle, and operable to provide a reverse mode.

Referring to FIG. 7, a third embodiment of the transmission is generally shown at 100. Similar to the second embodiment of the transmission shown in FIG. 6, the third embodiment of the transmission 100 shown in FIG. 7 includes the fixed ratio gear reduction system 56 embodied as the third planetary gear set 72. However, the application shown in FIG. 7 includes a stacked planetary gear set. The stacked planetary gear set provides a fourth node that enables a reverse gearing for the transmission 100. The stacked planetary gear set shown in FIG. 7 includes a sixth sun gear 102, a sixth planet carrier 104 supporting a plurality of sixth planet gears, a combined sun/ring gear 106, a seventh planet carrier 108 supporting a plurality of seventh planet gears, and a seventh ring gear 110. The sixth sun gear 102 and the sixth planet gears of the sixth planet carrier 104 are disposed in meshing engagement. The sixth planet gears of the sixth planet carrier 104 and the combined sun/ring gear 106 are disposed in meshing engagement. The combined sun/ring gear 106 and the seventh planet gears of the seventh planet carrier 108 are disposed in meshing engagement. The seventh planet gears of the seventh planet carrier 108 and the seventh ring gear 110 are disposed in meshing engagement.

The first gear reduction brake 90 selectively couples the combined sun/ring gear 106 to the stationary member 30, such as but not limited to the housing of the transmission 100. The first gear reduction brake 90 may be selectively engaged and disengaged with the first gear reduction clutch 94 to prevent or allow rotation of the combined sun/ring gear 106 relative to the stationary member 30 respectively. Accordingly, when the first gear reduction clutch 94 is engaged, the first gear reduction brake 90 prevents or limits rotation of the combined sun/ring gear 106 relative to the stationary member 30, and when the first reduction clutch 94 is disengaged, the first gear reduction brake 90 allows rotation of the combined sun/ring gear 106 relative to the stationary member 30.

The second gear reduction brake 92 couples the seventh ring gear 110 to a stationary member 30, such as but not limited to the housing of the transmission 100. The second gear reduction brake 92 may be selectively engaged and disengaged with the second gear reduction clutch 96 to prevent or allow rotation of the seventh ring gear 110 relative to the stationary member 30 respectively. Accordingly, when the second gear reduction clutch 96 is engaged, the second gear reduction brake 92 prevents or limits rotation of the seventh ring gear 110 relative to the stationary member 30, and when the second reduction clutch 96 is disengaged, the second gear reduction brake 92 allows rotation of the seventh ring gear 110 relative to the stationary member 30.

The first ring gear 44 is connected to the sixth sun gear 102. The sixth planet carrier 104 and the seventh planet carrier 108 are simultaneously connected to the second ring gear 52. The first gear reduction brake 90 and the second gear reduction brake 92 may each be independently engaged and/or disengaged to provide the reverse gearing for the transmission 100. For example, the transmission 100 may be operated in a reverse gearing when the first gear reduction brake 90 is disengaged to allow rotation of the combined sun/ring gear 106 relative to the stationary member 30 and the second gear reduction brake 92 is engaged to prevent rotation of the seventh ring gear 110 relative to the stationary member 30. Alternatively, the transmission 100 may be operated in a forward gearing when the first gear reduction brake 90 is engaged to prevent rotation of the combined sun/ring gear 106 relative to the stationary member 30 and the second gear reduction brake 92 is disengaged to allow rotation of the seventh ring gear 110 relative to the stationary member 30.

The first gear reduction brake 90 and the second gear reduction brake 92 may each be simultaneously engaged to ground the input member 24, to prevent or resist rotation of the input member 24. As such, the first gear reduction brake 90 and the second gear reduction brake 92 may be simultaneously engaged to switch between hybrid operation, in which the engine 22 and one or more of the electric devices are used to power the vehicle, into a fully electric mode when only the electric devices are used to power the vehicle.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A transmission comprising:
    an input member;
    an output member;
    a first electric device;
    a second electric device;
    a first planetary gear set coupled to the first electric device, and including a first sun gear, a first ring gear, and a plurality of first planet gears attached to a first planet carrier;
    a second planetary gear set coupled to the second electric device, and including a second sun gear, a second ring gear, and a plurality of second planet gears attached to a second planet carrier;
    wherein the output is coupled to both the first planetary gear set and the second planetary gear set;
    wherein the input is connected to the first planetary gear set; and
    a fixed ratio gear reduction system coupling the input and the second planetary gear set, and operable to transmit rotation from the input to the second planetary gear set at a reduced rotational speed and at an increased torque, wherein the fixed ratio gear reduction system includes:
        an idler gear connected to the input;
        a countershaft having a first fixed gear in meshing engagement with the idler gear; and
        a second fixed gear coupled to the second planetary gear set;
        wherein the first fixed gear and the second fixed gear are both fixed for rotation with the countershaft.

2. The transmission set forth in claim 1, wherein:
    the input is connected to the first planet carrier;
    the output is connected to another one of the first sun gear, the first ring gear, and the first planet carrier; and
    the first electric device is connected to another one of the first sun gear, the first ring gear, and the first planet carrier.

3. The transmission set forth in claim 1, wherein the first electric device is connected to the first sun gear.

4. The transmission set forth in claim 3, wherein the output is connected to the first ring gear.

5. The transmission set forth in claim 4, wherein the input is connected to the first planet carrier.

6. The transmission set forth in claim 1, wherein:
    the fixed ratio gear reduction system is connected to one of the second sun gear, the second ring gear, and the second planet carrier;
    the output is connected to another one of the second sun gear, the second ring gear, and the second planet carrier; and
    the second electric device is connected to another one of the second sun gear, the second ring gear, and the second planet carrier.

7. The transmission set forth in claim 1, wherein the second electric device is connected to the second sun gear.

8. The transmission set forth in claim 7, wherein the output is connected to the second planet carrier.

9. The transmission set forth in claim 8, wherein the fixed ratio gear reduction system is connected to the second ring gear.

10. The transmission set forth in claim 7, wherein the output is connected to the second planet carrier, and the fixed ratio gear reduction system is connected to the second ring gear.

11. The transmission set forth in claim 1, wherein the second fixed gear is disposed in meshing engagement with the second ring gear.

12. The transmission set forth in claim 1, further comprising an input brake coupled to the input member and selectively engageable for controlling rotation of the input member.

13. A powertrain comprising:
    an engine;
    a transmission coupled to the engine for receiving torque from the engine; and
    a final drive system coupled to the transmission for receiving torque from the transmission;
    wherein the transmission includes:
        an input member coupled to the engine;
        an output member coupled to the final drive system;
        a first electric device;
        a second electric device;
        a first planetary gear set coupled to the first electric device, and including a first sun gear, a first ring gear, and a plurality of first planet gears attached to a first planet carrier;
        a second planetary gear set coupled to the second electric device, and including a second sun gear, a second ring gear, and a plurality of second planet gears attached to a second planet carrier;
        wherein the output is coupled to both the first planetary gear set and the second planetary gear set;
        wherein the input is connected to the first planetary gear set; and
        a fixed ratio gear reduction system coupling the input and the second planetary gear set, and operable to transmit rotation from the input to the second planetary gear set at a reduced rotational speed and at an increased torque, wherein the fixed ratio gear reduction system includes:
            an idler gear connected to the input;
            a countershaft having a first fixed gear in meshing engagement with the idler gear; and
            a second fixed gear coupled to the second planetary gear set;
            wherein the first fixed gear and the second fixed gear are both fixed for rotation with the countershaft.

* * * * *